United States Patent [19]

Brennan et al.

[11] Patent Number: 4,588,699
[45] Date of Patent: May 13, 1986

[54] HIGH STRENGTH, THERMALLY STABLE MAGNESIUM ALUMINOSILICATE GLASS-CERAMIC MATRIX-SIC FIBER COMPOSITES

[75] Inventors: John J. Brennan, Portland, Conn.; Kenneth Chyung; Mark P. Taylor, both of Painted Post, N.Y.

[73] Assignee: United Technologies Corporation, Hartford, Conn.

[21] Appl. No.: 476,301

[22] Filed: Mar. 17, 1983

[51] Int. Cl.⁴ .................... C03C 10/06; C03C 10/08; C03C 14/00; C04B 35/56

[52] U.S. Cl. ........................................ 501/9; 428/698; 501/8; 501/32; 501/88; 501/89; 501/95

[58] Field of Search .................... 501/8, 32, 9, 89, 95, 501/88; 428/697, 698

[56] References Cited

U.S. PATENT DOCUMENTS

| 3,480,452 | 11/1969 | Fleischner et al. | 501/9 |
| 4,314,852 | 2/1982 | Brennan et al. | 501/95 |
| 4,324,843 | 4/1982 | Brennan et al. | 428/367 |
| 4,410,635 | 10/1983 | Brennan et al. | 501/88 |
| 4,415,672 | 11/1983 | Brennan et al. | 501/4 |

FOREIGN PATENT DOCUMENTS

| 1459178 | 12/1976 | United Kingdom | 501/9 |
| 1535202 | 12/1978 | United Kingdom | 501/8 |

Primary Examiner—Mark L. Bell
Attorney, Agent, or Firm—Harry J. Gwinnell

[57] ABSTRACT

A silicon carbide fiber reinforced barium modified magnesium aluminosilicate matrix composite is described having high strength and thermal stability at temperature in excess of 1200° C. The matrix material contains about 5% to about 14% magnesium oxide and about 5% to about 25% barium oxide. While any suitable ratios of fiber to matrix can be used, the composite for most applications for example, in the heat engine area, will contain approximately 20% to 50% by volume silicon carbide fibers.

2 Claims, 1 Drawing Figure

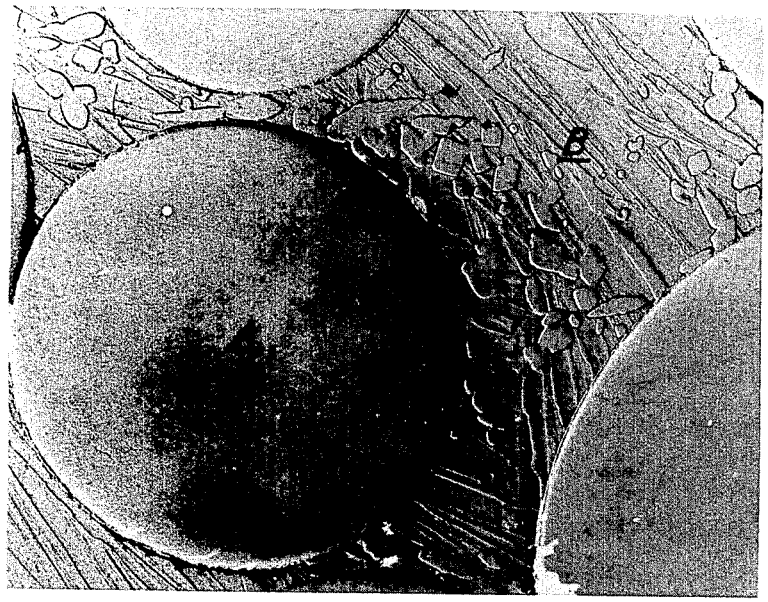
5300 X

HIGH STRENGTH, THERMALLY STABLE MAGNESIUM ALUMINOSILICATE GLASS-CERAMIC MATRIX-SIC FIBER COMPOSITES

DESCRIPTION

1. Technical Field

The field of art to which this invention pertains is fiber reinforced composites.

2. Background Art

Because of the scarcity and increasing expense of many conventional high temperature stable structural metals, increased attention has focused on non-metal containing composites as replacements for conventional high temperature use metal-containing materials. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature.

Ceramic, glass, and glass-ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass ceramic material with inorganic fibers dispersed in continuous or discontinuous fashion therewithin.

Nevertheless, while such composites, for example, graphite fiber reinforced glass and alumina fiber reinforced glass, can be utilized at higher use temperatures than conventional high temperature structural metals, there is still much room for improvement. To illustrate, while the graphite fiber reinforced glass composite demonstrates high levels of strength, fatigue resistance, and fracture toughness, it is also susceptible to detrimental fiber oxidation at elevated temperatures. And while composites such as alumina fiber reinforced glass are oxidatively stable at high temperatures, the overall strength and toughness levels obtainable with these composites are less than those possible with a graphite reinforced glass system, for example. Similarly, high strength and toughness properties have been obtainable with silicon carbide fiber reinforced glass composites (note U.S. Pat. No. 4,314,852) and silicon carbide fiber reinforced ceramic composites (note U.S. Pat. No. 4,324,843).

Although glass-ceramic bodies customarily exhibit greater refractoriness and strength than their precursor glasses, there has been the desire to impart even higher mechanical strengths thereto. However, silicon carbide fibers have demonstrated a tendency to react with glass-ceramic matrices at high temperatures, which phenomenon has been a limiting factor in their utility as reinforcing elements. Accordingly, what is needed in the art is a composite with high strength, high fracture toughness, and oxidation stability at high temperatures.

DISCLOSURE OF INVENTION

The present invention is directed to a solution to the high temperature strength, fracture toughness, and oxidation stability problems which exist with composites of the prior art and comprises silicon carbide fiber reinforced glass-ceramic composites, wherein said glass-ceramic matrices have compositions within the base magnesium aluminosilicate system and contain magnesium oxide (MgO) and barium oxide (BaO).

The high strength composites according to the present invention comprise silicon carbide fibers in a glass-ceramic matrix of magnesium aluminosilicate containing by wt. about 5% to about 15% magnesium oxide and about 5% to about 25% barium oxide. The composite has high strength and thermal stability at temperatures in excess of 1200° C. and is substantially non-reactive with nickel superalloys at temperatures in excess of about 800° C.

Another aspect of the invention comprises a process of forming such composites by hot pressing a mixture of silicon carbide fibers and the above-described glass-ceramic matrix at temperatures of about 1200° C. to about 1500° C. Following the hot pressing, the composite is heat treated at temperatures of about 1100° C. to about 1200° C. in air to convert the glassy matrix material to the crystalline ceramic phase.

The foregoing, and other features and advantages of the present invention, will become more apparent from the following description and accompanying drawing.

BRIEF DESCRIPTION OF DRAWING

The FIGURE shows a fiber reinforced composite according to the present invention with the matrix in the crystalline state.

BEST MODE FOR CARRYING OUT THE INVENTION

A glass, which can be converted to a glass-ceramic, is the ideal matrix material to form the composites of the present invention. During composite densification the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. Specifically, it has been found that there exists a range of compositions in the Ba stuffed cordierite and barium osumilite systems that contain MgO (7.1–12.9 wt %) and BaO (5.7–14.1 wt %) and, at least in the bulk form, can be crystallized at 1100°–1200° C. to refractory crystal phases. These compositions are shown in Table I. Compositions 1, 2, and 3 are Ba stuffed cordierite while 4, 5, and 6 and 7, 8, and 9 are "fully stuffed" and "half stuffed" barium osumilites, respectively. The $Nb_2O_5$ in compositions 2, 5, and 8 and the $Ta_2O_5$ in compositions 3, 6, and 9 are present such that the formation of NbC and TaC reaction barrier layers around the SiC fibers that occurs during composite fabrication, as detailed in copending application Ser. No. 380,458, filed May 20, 1982, now U.S. Pat. No. 4,485,179 could be compared to similar components in the copending application, the disclosure of which is incorporated by reference.

The results of flexural strength tests done on hot-pressed samples are shown in Table II. From these results it can be seen that at least two compositions (#4 and #9) have resulted in quite strong composites. Heat-treatment tests on composition 9 have shown that these samples are very difficult to crystallize and exhibit swelling and bloating upon 1200° C. heat-treatment. Composition #4 has resulted in composites that exhibit room temperature strengths that, while not quite as high as some lithium aluminosilicate/SiC fiber composites, are very good and are essentially retained after long (60 hrs) heat treatment in air at 1200° C. The optimum heat-treatment to fully crystallize the matrix to barium osumilite has not been determined, however, 1 hr at 1200° C. is not enough while either 24 or 60 hrs is apparently sufficient. The fully crystallized (60 hrs, 1200° C.) composite is shown in transmission electronmicroscope replica cross-section in the FIGURE. The striated phase is barium osumilite ($BaMg_2Al_6Si_9O_{30}$) while the blocky crystals are mullite ($3Al_2O_3.2SiO_2$). The 1200° C. flexural strength of $125-130 \times 10^3$ psi of a fully crystallized magnesium aluminosilicate/SiC fiber composite (#4) is as high or higher than any 1200° C. strength ever recorded for a lithium aluminosilicate fiber composite and there is no evidence of thermal instability at elevated temperatures in air as there is in lithium aluminosilicate/SiC fiber composites. The load-deflection curve for the magnesium aluminosilicate matrix/SiC fiber composite (#4) tested at 1200° C. was completely linear, indicative of the refractory nature of the matrix. Nonlinear load-deflection curves are usually indicative of residual glass remaining in the matrix becoming soft at elevated temperatures.

The 1200° C. thermal stability of the Ba-magnesium aluminosilicate/SiC fiber composite in air is much superior to that of previously tested lithium aluminosilicate matrix/SiC fiber composites. Table III gives the results of long time aging tests in air at 1200° C. for a typical refractory lithium aluminosilicate matrix composite with the $Nb_2O_5$ reaction inhibiting addition and for the Ba-magnesium aluminosilicate matrix/SiC fiber composite (#4). It can be seen that, while not as strong in the as pressed condition, the #4 composite retains its strength much better in air at 1200° C. than the lithium aluminosilicate matrix composite, exhibits no fiber/matrix reaction, and actually increases in strength at 1200° C. to a high of 160 ksi after aging 260 hrs at 1200° C. in air.

In addition, to its high strength from room temperature to 1200° C. and excellent oxidative and thermal stability, the magnesium aluminosilicate/SiC fiber composites have other advantages over lithium aluminosilicate/SiC fiber composites. Nickel based superalloy/composite interaction studies that were conducted in order to determine if there exist any problems in attaching the glass-ceramic/SiC composites to superalloys that will operate at temperatures to 1000° C. in air have shown that above approximately 800° C. the lithium aluminosilicate/SiC composites react with nickel based superalloys while the magnesium aluminosilicate/SiC composites do not. This difference is illustrated in Table IV. This aspect could prove critical for the use of these composites in heat engine applications. Other differences in properties between the composites of the present invention and those of the prior art is that the Ba-magnesium aluminosilicate/SiC composites should exhibit higher thermal conductivity and somewhat higher thermal expansion coefficient than lithium aluminosilicate/SiC fiber composites. For certain applications, higher values for these thermal properties could be important.

TABLE I

Ba Modified Magnesium Aluminosilicate Glass-Ceramic Compositions (Wt %)

| | Ba-Stuffed Cordierite | | | Fully-Stuffed Ba Osumilite | | | Half-Stuffed Ba Osumilite | | |
|---|---|---|---|---|---|---|---|---|---|
| | 1 | 2 | 3 | 4 | 5 | 6 | 7 | 8 | 9 |
| $SiO_2$ | 43.4 | 42.1 | 41.3 | 49.7 | 48.2 | 47.3 | 58.9 | 57.2 | 56.1 |
| $Al_2O_3$ | 36.9 | 35.8 | 35.1 | 28.1 | 27.3 | 26.8 | 25.0 | 24.3 | 23.8 |
| MgO | 12.9 | 12.6 | 12.3 | 7.4 | 7.2 | 7.1 | 7.9 | 7.7 | 7.5 |
| BaO | 6.2 | 6.0 | 5.7 | 14.1 | 13.7 | 13.4 | 7.5 | 7.3 | 7.2 |
| $As_2O_3$ | 0.7 | 0.7 | 0.7 | 0.7 | 0.7 | 0.7 | 0.7 | 0.7 | 0.7 |
| $Nb_2O_5$ | — | 3.0 | — | — | 3.0 | — | — | 3.0 | — |
| $Ta_2O_5$ | — | — | 5.0 | — | — | 5.0 | — | — | 5.0 |

TABLE II

Flexural Strength of Ba-Magnesium Aluminosilicate/SiC Fiber Composites (Unidirectional Fiber Orientation)

| | Room Temperature 3-PT Flexural Strength ($10^3$ PSI) | | | 1200° C. 3-PT Flexural Strength ($10^3$ PSI) | | | |
|---|---|---|---|---|---|---|---|
| Matrix | As pressed | 1200° C. 1 hr | 1200° C. 60 hrs | 1200° C. 1 hr | 1200° C. 24 hrs | 1200° C. 60 hrs | Comments |
| 1 | 65 | 37 | | | | | Brittle fracture after 1200° C. heat-treat |
| 3 | 57 | 25 | | | | | Brittle fracture after 1200° C. heat-treat |
| 4 | 105 | 93 | 91 | 6 | 125 | 130 | 1200° C., 1 hr not crystallized |
| 6 | 55 | | | | | | Semi-fibrous fracture, not heat-treated |
| 8 | 30 | | | | | | Very brittle |
| 9 | 110 | 93 | 84 | 17 | | | Samples bloated upon heat-treatment |

TABLE III

Flexural Strengths of Thermally Aged Lithium Aluminosilicate and Ba-Magnesium Aluminosilicate/SiC Fiber Composites 3-PT Flex after Heat Treat ($10^3$ PSI)

| Matrix | Test Temp. °C. | As pressed | 1200° C. 24 hrs | 1200° C. 60 hrs | 1200° C. 260 hrs | Remarks |
|---|---|---|---|---|---|---|
| Refractory lithium aluminosilicate | RT | 140 | 80 | 65 | — | Fiber/Matrix rxn. at 1200° C. in air |
| | 1200 | — | 110 | — | — | |
| Ba-Magnesium | RT | 105 | 95 | 91 | 87 | No fiber/matrix |

TABLE III-continued

Flexural Strengths of Thermally Aged Lithium Aluminosilicate
and Ba-Magnesium Aluminosilicate/SiC Fiber Composites
3-PT Flex after
Heat Treat ($10^3$ PSI)

| Matrix | Test Temp. °C. | As pressed | 1200° C. 24 hrs | 1200° C. 60 hrs | 1200° C. 260 hrs | Remarks |
| --- | --- | --- | --- | --- | --- | --- |
| aluminosilicate #4 | | | | | | rxn. even after 260 hrs at 1200° C. in air |
| | 1200 | — | 125 | 130 | 160 | |

TABLE IV

Glass-Ceramic Matrix/SiC Fiber Composite-Ni Based Superalloy Interaction Studies

| Composite | Ni Superalloy | Air Exposure Conditions | Observations |
| --- | --- | --- | --- |
| Lithium aluminosilicate/ SiC Fiber | MAR M-200 ($Al_2O_3$ former) | 1000° C., 20 hrs | Cross metal oxidation to NiO, CoO |
| Lithium aluminosilicate/ SiC Fiber | MAR M-200 ($Al_2O_3$ former) | 900° C., 20 hrs | Reaction reduced, but still occurring |
| Magnesium aluminosilicate/ SiC Fiber | MAR M-200 ($Al_2O_3$ former) | 1000° C., 20 hrs | No reaction |

A preferred composition according to the present invention comprises in weight percent: about 5% to about 15% MgO, about 20% to about 40% $Al_2O_3$, about 40% to about 60% $SiO_2$, about 5% to about 25% BaO, about 0.5% to about 3% $As_2O_3$, about 0% to about 10% $Nb_2O_5$ and about 0% to about 10% $Ta_2O_5$. If desired the Ta and Nb oxides can be included if fiber matrix interaction is a problem. Note U.S. patent application Ser. No. 380,458 the disclosure of which is incorporated by reference.

These compositions are crystallized in situ by exposure to temperatures of about 750°–1200° C. As can be appreciated, the time of exposure to achieve a highly crystalline body is dependent upon the temperature utilized. However, dwell periods ranging between about 0.25–60 hours are common.

In general, the inventive process contemplates the starting materials as being present in the form of glass powders. Where the feedstock is present in crystalline form, it will be necessary to melt the material, to cool the melt sufficiently rapidly to form a glass body, and, thereafter, to comminute the glass to a powder preferably passing through a No. 325 United States Standard Sieve (44 microns).

An important facet of the invention is to select glass-ceramic matrix materials such as those described above which can be densified (in combination with the silicon carbide fibers) in the glassy state with a viscosity low enough to permit complete densification with subsequent transformation into a substantially complete crystalline state providing a composite with a use temperature in excess of 1200° C. It is also possible to convert the starting crystalline powder to the glassy state during preheat treatment prior to application of pressure for densification.

Any silicon carbide fiber system with the requisite strength can be used, although a multifilament silicon carbide yarn with an average filament diameter up to 50 microns is preferred and yarn with average filament diameter of 5 to 50 microns is especially preferred. Nippon Carbon Company of Japan produces such a yarn with about 500 fibers per tow and an average fiber diameter of about 10 microns. The average strength of the fiber is approximately 2000 MPa (300,000 psi), and it has a use temperature of up to 1500° C. The yarn has a density of approximately 2.6 grams per cc and an elastic modulus of approximately 221 GPa ($32 \times 10^6$ psi) Note the FIGURE where A is the silicon carbide fiber, and B the matrix material after the crystallization treatment.

If a composite with discontinuous fibers is to be made, the fibers are chopped to paper length (e.g., about 1.0 to about 3.0 cm) by any conventional means and formed into sheets by conventional paper making techniques. While the silicon carbide paper may normally be isotropically laid, i.e., a substantially equal number of fibers in-plane in every direction, the fiber laying can be favored in a particular in-plane direction in preparation of an article when it is known that such article will be receiving stress primarily in a single direction. However, to insure the improved properties of composites of the present invention, such favored laying should not exceed about 90% of the total fiber laying, the fibers should be laid in-plane, and the average fiber length should preferably be about 1 to about 3 cm.

The composites of the present invention are preferably formed in the case of the discontinuous fiber-containing composites by cutting the formed paper to the desired composite shape followed by papermaking binder removal, for example, by solvent immersion or touching each ply to a Bunsen burner flame to burn off the binder. The plies are next either dipped into a slurry of the glass or simply stacked with layers of powdered glass placed between each ply sufficient to substantially fill the spaces between the plies. The formed articles are then hot pressed at elevated temperature to form the composites.

The preferred method for forming the articles of the present invention is by hot pressing the mixture of silicon carbide fibers and glass powder as mentioned above. This method gives particular design flexibility in orienting the fibers, and sheets formed by such method are particularly adapted to hot pressing into desired shapes. An exemplary method comprises continuously unwinding a roll of silicon carbide paper, continuous fiber, or yarn from a spool at a moderate rate of speed and passing such fibers through a slip of the powdered glass, solvent, and plasticizer to impregnate the fibers. The impregnated fibers can then be rewound onto a larger rotating spool. An exemplary slip composition may be composed of 130 gm of powdered glass and 390 ml of propanol. An alternative composition may comprise 100 gm of the glass, 200 ml of water, and 100 ml of a latex binder such as RHOPLEX ®. RHOPLEX is a resin suspension or dispersion marketed by Rohm and Haas, Philadelphia, Pa. Excess glass and solvent can be removed by pressing a squeegee against the drum as it winds. Preferably the ground glass is sized so that 90% of it passes through a −325 mesh sieve. The thus impregnated tape is then dried either at ambient temperature or with a radiant heat source to remove solvent. Where an organic binder or other higher melting organic adjuvant has been utilized, it may be necessary to fire the tape at somewhat elevated temperatures to burn out the organic materials prior to hot pressing.

Following impregnation, the sheets of fibers are removed from the drum and cut into strips to conform to the dimensions of the article to be fabricated. Where hot pressing is utilized to form the composite, that operation may be undertaken, preferably either under vacuum or an inert gas, such as argon, in metal dies coated with colloidal boron nitride, or graphite dies sprayed with boron nitride powder, at pressures up to about 10,000 psi, the preferred range being about 1000-2000 psi, and temperatures of about 1100° C.-1500° C. Time of hot pressing will vary depending on composite makeup, but generally will be accomplished between about 1 minute and 1 hour. Higher pressures permit the use of lower temperatures and shorter dwell times. Silicon carbide fiber loading in the composite is preferably about 15% to about 70% by volume. The mold can also be vibrated to ensure uniform distribution of the glass powder over the laid fiber surfaces. Processing by starting with the matrix material in the glassy state to permit composite densification by hot pressing, followed by converting the glass into the crystalline state, largely contributes to the superior properties of the resulting composite. If, after hot pressing, any significant portion of the matrix material is found to be in the glassy state, further heat treatment may be necessary to substantially completely crystallize the matrix for optimum high temperature performance. And, although it is preferred to have the matrix material in the fully crystalline state, acceptable composite properties are attainable even if some of the matrix is retained in the composite in the glassy state, e.g., up to 25% by weight. Nevertheless, the greatest degree of refractoriness will normally be exhibited where the glass content of the matrix is very low.

The processing parameters and composition of the material used can vary widely, depending upon the ultimate use of the article. While it is not necessary to lay the plies in any particular direction, it has been found that the best strength properties for discontinuous fiber reinforced glass-ceramic matrix composites appear to be obtained when each individual ply, in the case of the non-woven articles, is laid up in the same direction, i.e., all plies are aligned during layup to keep colinear their original orientation with regard to the paper roll axis.

In the case of the continuous fiber composites, the fibers can be laid up relative to one another in alternating ply stacks in any sequence desired, e.g., each layer with fibers unidirectional (0° orientation), alternating plies of fiber oriented 0° and 90° or 0°/30°/60°/90°/, 0°/±45°/90°, etc.

To illustrate the processing parameters and the desirable properties demonstrated by the inventive products, the following working example was carried out.

EXAMPLE

A continuous tow of silicon carbide fibers provided by Nippon Carbon Company as described above was run through a Bunsen burner flame to burn off the sizing. The tow was then run through a slurry of Ba modified magnesium aluminosilicate glass powder in water plus binder, said glass having the composition recorded in Table V. The glass of Table V is reported in terms of parts by weight on the oxide basis, but, because the sum of the components totals or closely approximates 100, for all practical purposes the values listed may be deemed to reflect weight percent.

TABLE V

| $SiO_2$ | 49.7% | BaO | 14.1% |
|---|---|---|---|
| $Al_2O_3$ | 28.1% | $As_2O_3$ | 0.7% |
| MgO | 7.4% | | |

An exemplary slip composition comprised 100 grams of powdered glass in 200 milliliters of water and 100 ml of latex binder. Preferable, the glass is ground so that 90% of it passes through a −325 mesh sieve. After passing through the slurry, the tows are collected on a rotating drum to form a fiber "tape" impregnated with the glass powder. The impregnated fiber tapes are then heated to approximately 600° C. in air to remove the binder. The resulting impregnated tapes were laid about 16 layers deep in a die assembly for consolidation at elevated temperature. Hot pressing consolidation was performed at a control thermocouple temperature of 1500° C. at a pressure of about 6.9 MPa ($1 \times 10^3$ psi) for about 5 minutes in argon. The resultant composite contained about 50% by volume silicon carbide fibers the remainder consisting of Ba-modified magnesium aluminosilicate glass-ceramic in the glassy state. The samples were about 0.10 inch (0.25cm) thick.

Table VI recites the flexural strength displayed by the composites both immediately after the hot pressing consolidation and after samples of the composites had been subjected to subsequent heat treatments in an air atmosphere. Measurements were conducted at room temperature (RT) and at 1200° C. in argon.

TABLE VI 3-pt Flexural Strength of Ba Modified Magnesium Aluminosilicate/SiC Fiber Composites Unidirectional (0°) Fiber Orientation

| | RT Bend Strength $10^3$ psi | | | 1200° C. Bend Strength $10^3$ psi | |
|---|---|---|---|---|---|
| Example | As pressed | 1200° C. 60 hrs | 1200° C. 230 hrs | 1200° C. 60 hrs | 1200° C. 230 hrs |
| Matrix #4 | 103 | 87 | 72 | 164 | 161 |

By unidirectional is meant all the silicon carbide fibers are oriented in each individual layer in substantially the same axial direction (±5°). By uniaxial is meant that each layer in the composite is oriented such that all the unidirectionally laid fibers in all layers are oriented in substantially the same axial direction (±5°).

Based on the composition of the matrix material, the particular fiber reinforcement, and the process of forming the composite, an article with exceptional high strength, fracture toughness and oxidation resistance especially at high temperatures is obtained. Each continuous fiber reinforced layer of the composite, regardless of the number of layers or orientation, has an axial flexural strength at room temperature greater than 70,000 psi and, in most instances, greater than 90,000 psi. As for fracture toughness, although specific fracture toughness measurements have not been made on the composites of the present invention, it is anticipated that each layer will have a critical stress intensity factor ($K_{IC}$) greater than $10 \times 10^3$ psi in.$^{\frac{1}{2}}$ It is particularly noteworthy that, even after initial fracture, composites of the present invention retain a substantial fraction of their original untested strength. This resistance to fracture, even in the presence of initiated damage, is distinctly different from the brittle nature of conventional ceramic articles.

The reinforced ceramics of the present invention have particular utility in environments where oxidation resistance, high strength, and toughness are required, and, because those properties are retained in a high temperature environment (e.g., in excess of 1000° C. and even in excess of 1200° C.), the inventive composites are eminently suitable for use in such applications as a gas turbine engine or internal combustion engine environment, and in high temperature structural ceramic components.

Although this invention has been shown and described with respect to detailed embodiments thereof, it will be understood by those skilled in the art that various changes in form and detail thereof may be made without departing from the spirit and scope of the claimed invention.

We claim:

1. A silicon carbide fiber reinforced glass-ceramic composite consisting essentially of about 15% to about 70% by volume of silicon carbide fibers implanted within a glass-ceramic matrix consisting essentially of:

MgO—5–15%,
$As_2O_3$—0.5–3%,
$Al_2O_3$—20–40%,
$Nb_2O_5$—0–10%,
$SiO_2$—40–60%,
$Ta_2O_5$—0–10%,
BaO—5–15%, and when fully crystallized is predominantly barium osumilite, the composite having high strength and thermal stability at temperatures in excess of 1200° C.

2. The composite of claim 1 wherein the magnesium aluminosilicate contains about 7.4% MgO, about 28.1% $Al_2O_3$, about 49.7% $SiO_2$, about 14.1% BaO, and about 0.7% $As_2O_3$.

* * * * *